United States Patent
Brouwer

(10) Patent No.: US 7,415,921 B2
(45) Date of Patent: Aug. 26, 2008

(54) APPARATUS FOR PREPARING A BEVERAGE SUITABLE FOR CONSUMPTION, SUCH AS COFFEE

(75) Inventor: Gustaaf Frans Brouwer, Nijkerk (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 468 days.

(21) Appl. No.: 10/480,075

(22) PCT Filed: Jun. 10, 2002

(86) PCT No.: PCT/NL02/00377

§ 371 (c)(1),
(2), (4) Date: Aug. 23, 2004

(87) PCT Pub. No.: WO02/100227

PCT Pub. Date: Dec. 19, 2002

(65) Prior Publication Data

US 2005/0003052 A1    Jan. 6, 2005

(51) Int. Cl.
*A47J 31/00*        (2006.01)
(52) U.S. Cl. .............................. 99/283; 99/293; 99/300; 137/501; 137/512.3
(58) Field of Classification Search ................... 99/283, 99/293, 300, 307, 302 R; 137/501, 495, 137/341, 493.2, 512.3
See application file for complete search history.

(56) References Cited

U.S. PATENT DOCUMENTS

| | | | | |
|---|---|---|---|---|
| 5,267,506 A | * | 12/1993 | Cai | 99/280 |
| 5,778,765 A | | 7/1998 | Klawuhn et al. | |
| 5,842,407 A | * | 12/1998 | Schmed | 99/290 |
| 6,481,339 B1 | * | 11/2002 | Castleberry | 99/305 |

FOREIGN PATENT DOCUMENTS

GB         1170878 A      11/1969

* cited by examiner

*Primary Examiner*—Reginald L Alexander

(57) ABSTRACT

An apparatus for preparing a beverage provided with a storage tank, a heater and a three-way valve. The three-way valve is provided with in inlet, a first outlet and a second outlet. The three-way valve is provided with a first member which is freely movable between a first and second extreme position wherein the first member can move under the influence of the liquid flow from the inlet to the first outlet and/or the second outlet from the first extreme position towards the second extreme position and in the second extreme position closes off the first outlet so that the liquid flow then extends from the inlet to the second outlet. The three-way valve is further provided with a second member which is freely moveable under the influence of a liquid flow from the inlet to the second outlet between a third and fourth extreme position wherein the second member, under the influence of the liquid flow from the inlet to the second outlet, moves from the third extreme position to the fourth extreme position and in the third extreme position blocks a liquid flow from the second outlet in the direction of the inlet.

31 Claims, 9 Drawing Sheets

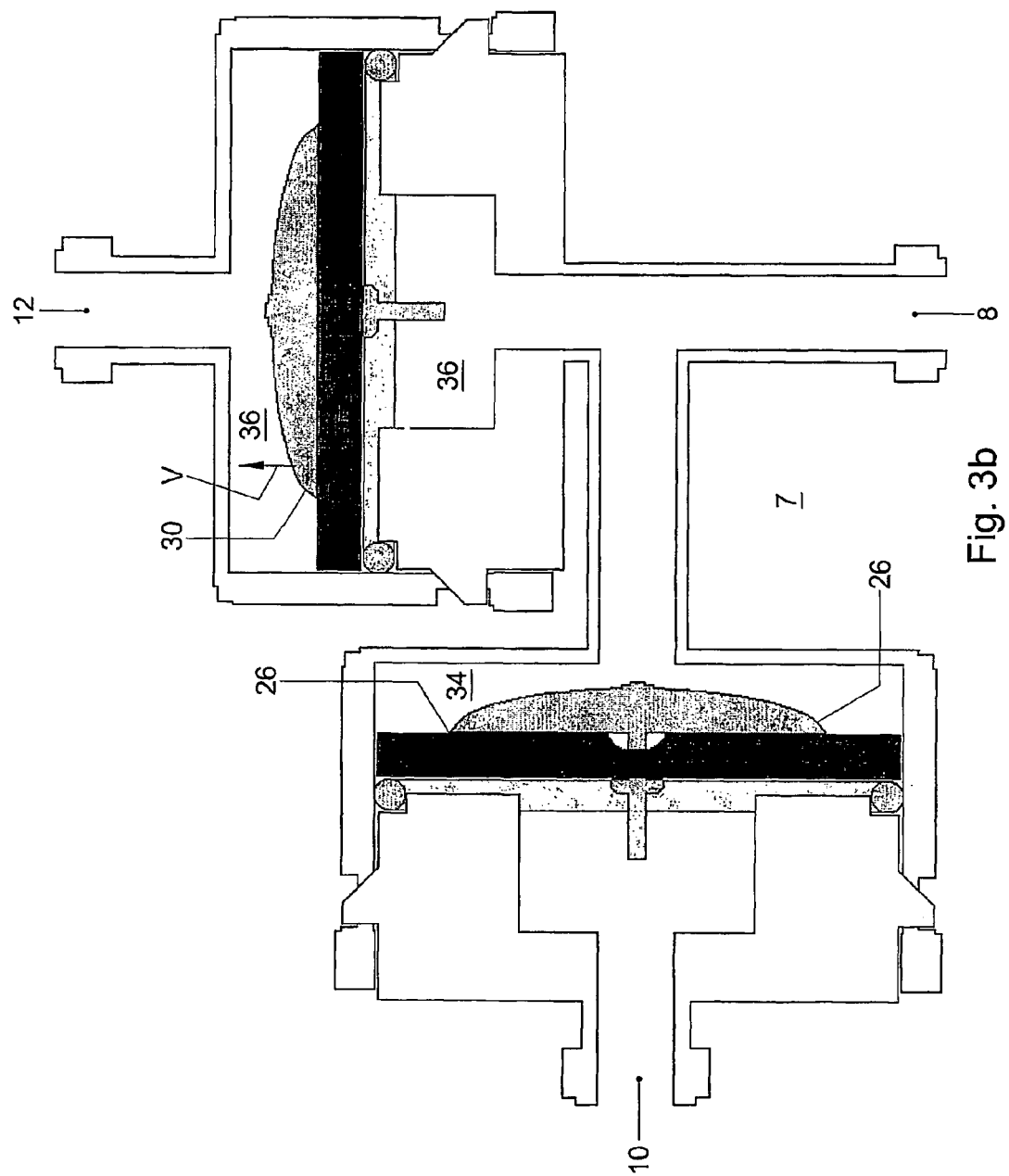

APPARATUS FOR PREPARING A BEVERAGE SUITABLE FOR CONSUMPTION, SUCH AS COFFEE

The invention relates to an apparatus for preparing at least one type of beverage suitable for consumption such as coffee or chocolate milk on the basis of a hot liquid such as water, provided with a storage tank which, in use, is filled with a liquid such as water, a heater and a three-way valve, wherein the three-way valve is provided with an inlet, a first outlet and a second outlet, wherein a pump is in fluid communication with the storage tank and an inlet of the heater for pumping the liquid from the storage tank to the boiler and wherein an outlet of the heater is in fluid communication with the inlet of the three-way valve, the first outlet of the three-way valve being in fluid communication via a first outflow path with the storage tank and/or an inlet of the pump for returning liquid from the three-way valve to the storage tank and/or the pump, and wherein the second outlet of the three-way valve is in fluid communication via a second outflow path with a beverage preparing unit for preparing a beverage suitable for consumption on the basis of the hot liquid, wherein the three-way valve is provided with a first member which is freely moveable, under the influence of a liquid flow from the inlet to the first outlet and/or the second outlet between a first and a second extreme position, wherein, under the influence of the liquid flow from the inlet to the first outlet and/or the second outlet the first member can move from the first position in the direction of the second extreme position, and, in the second extreme position, closes off the first outlet so that the liquid flow then extends from the inlet to the second outlet.

The invention also relates to a three-way valve provided with an inlet, a first outlet and a second outlet, wherein the three-way valve is provided with a first member which, under the influence of a liquid flow from the inlet to the first outlet and/or the second outlet, is freely moveable between a first and second extreme position wherein the first member, under the influence of the liquid flow from the inlet to the first outlet and/or the second outlet, can move from the first extreme position towards the second extreme position and in the second extreme position closes off the first outlet so that the liquid flow then extends from the inlet to the second outlet.

Such an apparatus and three-way valve are known per se. The known three-way valve is provided with a compartment comprising the inlet, the first outlet and the second outlet. The first member is of convex design. Further, in the second outflow path a check valve is included.

The operation of the known apparatus is as follows. The storage tank is filled with water. Then, the pump is started. It pumps water from the storage tank to the heater. The water is heated by the heater. The water is pumped further via the heater to the inlet of the three-way valve. Under the influence of a water flow from the inlet to the first and/or second outlet, the first member will move towards the first outlet and rapidly close off the first outlet. The first outlet then remains closed off due to the pressure prevailing in the three-way valve. Consequently, the water which is pumped via the inlet into the three-way valve will only be able to leave the three-way valve via the second outlet, and flows further via the second outflow path to the beverage preparing unit known per se. Such a beverage preparing unit known per se is for instance described in Dutch patent application 1006034 (or European patent application EP 0 878 158). In this beverage preparing unit known per se, on the basis of the supply of the hot water, via the second outflow path for instance a café crème is formed which is dispensed into a small mug or a cup.

After the beverage suitable for consumption is prepared, the pump is stopped. After the pump has been stopped, the heater will continue dispensing expansion water for some time because the heater has not cooled down yet. This expansion water will flow to the beverage preparing unit and cause it to drip. The check valve has a high flow resistance so that the pressure in the three-way valve, after the pump has been stopped, will decrease relatively slowly. As a result, the member will move relatively slowly from the first outlet to the inlet. Accordingly, it takes relatively long before the first outlet is opened again. After the first outlet has opened, the expansion water can be returned from the heater via the first outlet to the storage tank and/or the inlet of the pump. That the expansion water does not flow via the second outflow path to the beverage preparing unit has to do with the fact that the first outflow path has a lower flow resistance than the second outflow path in combination with the beverage preparing unit. Conversely, hot water, present in the second outflow path between the three-way valve and the check valve, will flow back to the three-way valve and then, possibly, via the inlet to the heater.

A disadvantage of the known apparatus is that after the pump has been deactivated, it takes relatively long before the member clears the first outlet. This results particularly in the expansion water being supplied via the second outflow path to the beverage preparing unit while the pump has already stopped. This causes dripping and a spread in the brewing time, and hence an undesired spread in the quality of the beverage. Further, it is a disadvantage that a relatively large amount of water which is present in the second outflow path, which water can, inter alia, be expansion water, can flow back to the heater. As a result, the heater can become soiled when this water itself comprises components of the beverage suitable for consumption. Also, it is a great disadvantage that in this manner, the second outflow path is partly filled with air. The fact is that when, subsequently, a second consumption has to be prepared, first an amount of air will have to be forced from the second outflow path via the beverage preparing unit. As a result, the quality of the beverage is reduced and the amount of beverage prepared is less accurately determined.

The invention contemplates providing a solution to the above-mentioned problem.

To this end, the apparatus according to the invention is characterized in that the three-way valve is further provided with a second member which is freely moveable, under the influence of a liquid flow from the inlet to the second outlet, between a third and fourth extreme position wherein the second member can move under the influence of the liquid flow from the inlet to the second outlet from the third extreme position towards the fourth extreme position, and in the third extreme position blocks a liquid flow from the second outlet towards the inlet.

When, with the apparatus for preparing a beverage, the pump is started, the heated liquid which is supplied to the inlet will flow through the three-way valve towards the first outlet and/or the second outlet. As a result, the first member will move from the first extreme position to the second extreme position while closing off the first outlet. From that moment on, the liquid flow will flow from the inlet to the second outlet. From the second outlet, the liquid then flows through the second outflow path to the beverage preparing unit for preparing a beverage suitable for consumption on the basis of the hot liquid. When, thereupon, the pump is stopped, the first member can move relatively rapidly from the second extreme position to the first extreme position. This is the case because the pressure in the three-way valve can decrease rapidly. This pressure can decrease rapidly in connection with the possible relatively small flow resistance of the second member. As a result, any expansion water can be returned from the heater directly via the inlet and the first outlet to the storage tank and/or the inlet of the pump. As the first outlet can open relatively rapidly, dripping of the beverage preparing unit as a result of the expansion liquid from the heater is prevented. As, moreover, the second member can arrive at the third extreme position relatively rapidly, draining of the second outflow path via the inlet to the heater can also be prevented. What is also achieved if return flow is prevented, is that the pressure can decrease relatively rapidly after the pumping is stopped in the liquid flow path from the inlet to the second outlet. This, in turn, has as a result that the first member can leave the second extreme position relatively rapidly, so that the expansion water can be returned to the storage tank and/or the inlet of the pump virtually immediately after the pump is stopped. As, according to the invention, two separate members, apart from each other, are used for blocking the liquid flow path from the inlet to the first outlet and blocking the liquid flow path from the second outlet to the inlet, dripping and draining of the second outflow path can be minimized.

In particular, it holds that the three-way valve is disposed in one single housing. Preferably, it holds that the first member is heavier than the second member. As a result, after the pump is stopped, the first member will very rapidly leave the second extreme position to move towards the first extreme position. Due to the dripping, the brewing time is limited and the spread of the amount of brew—and hence the spread in dry matter (taste)—will therefore decrease in case a coffee beverage is prepared with the apparatus.

In particular, it holds that the three-way valve is provided with a first compartment in which the first member is situated, a second compartment in which the second member is situated and a fluid communication between the first and second compartment. The first compartment can then be provided with the inlet and the first outlet. The second compartment can be provided with the second outlet. In this manner, the three-way valve can be of very compact design. This particularly holds when the first and the second compartment are separated from each other by a dividing wall while the fluid communication extends through the dividing wall. A further advantage of this particular embodiment is that the fluid communication has a length which can correspond to the thickness of the dividing wall so that the flow resistance of the liquid flow path extending from the inlet to the second outlet can be relatively small.

According to a special embodiment of the apparatus according to the invention, it holds that the first member is designed as a freely moveable circumferential edge of a first flexible umbrella valve and the three-way valve is provided with a first seat for the first umbrella valve, the first umbrella valve being connected to the first seat and the first seat being provided with at least one groove while in the first extreme position the circumferential edge of the first umbrella valve abuts against the first seat and reaches over the groove so that a space is present between the circumferential edge of the first umbrella valve and the groove, which space releases a liquid flow from the inlet to the first outlet and wherein in the second extreme position the circumferential edge of the first umbrella valve abuts against the seat and extends in the groove so that the circumferential edge closes off the first inlet.

Such a first umbrella valve proves to work particularly reliably and is hardly subject to wear. In particular, it holds that the second member is designed as a freely moveable circumferential edge of a second flexible umbrella valve and the three-way valve is provided with a second seat for the second umbrella valve, the second umbrella valve being connected to the second seat while in the third extreme position the circumferential edge of the second umbrella valve abuts against the second seat and blocks a liquid flow from the second outlet towards the inlet and wherein in the fourth extreme position an intermediate space is present between the circumferential edge of the second umbrella valve and the second seat.

Such a second umbrella valve proves to work particularly reliably and is hardly subject to wear.

The three-way valve according to the invention is characterized in that the three-way valve is further provided with a second member which, under the influence of a liquid flow from the inlet to the second outlet, is freely moveable between a third and fourth extreme position wherein the second member under the influence of the liquid flow from the inlet to the second outlet can move from the third extreme position towards the fourth extreme position and in the third extreme position blocks a liquid flow from the second outlet in the direction of the inlet.

The invention will presently be further elucidated with reference to the drawing:

In the drawing:

FIG. 3b shows a partly cutaway front view of the three-way valve according to FIG. 3a;

FIG. 3c shows a front view in the direction of the tube p of FIG. 3a of a first valve seat with a first umbrella valve in the first extreme position of the first outlet of the three-way valve of FIG. 3a;

FIG. 3f shows a front view in the direction of the arrow p' of FIG. 3a of a second valve seat with a second umbrella valve in the third extreme position of the second outlet of the three-way valve of FIG. 3a.

Figure 1:
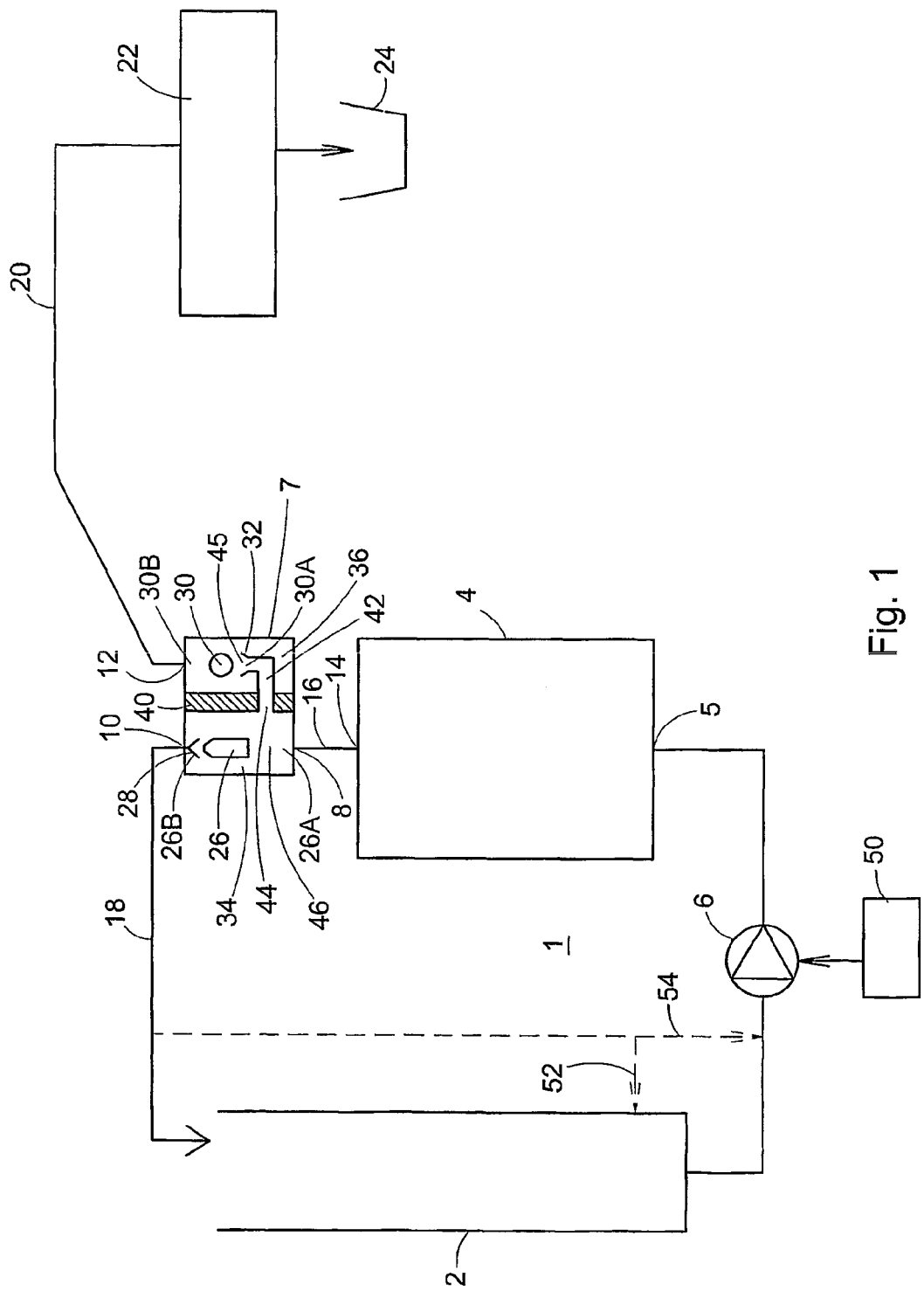
FIG. 1 shows a possible embodiment of an apparatus for preparing a beverage suitable for consumption according to the invention.

In FIG. 1, with reference numeral 1 is indicated an apparatus for preparing a beverage suitable for consumption such as coffee on the basis of a hot liquid such as water. In this example, an apparatus for preparing a café crème is involved. The apparatus is provided with a storage tank 2 which, in use, is filled with water. The apparatus is further provided with a heater 4 for heating water. An inlet 5 of the heater 4 is connected via pump 6 to the storage tank 2. In use, the pump 6 pumps water from the storage tank to the heater 4. The apparatus is further provided with a three-way valve 7 which is provided with an inlet 8, a first outlet 10 and a second outlet 12. One outlet 14 of the heater is connected via a duct 16 to the inlet 8 of the three-way valve 7. Via a first outflow path 18, the first outlet 10 is in fluid communication with the storage tank 2. Further, via a second outflow path 20, the second outlet 12 is in fluid communication with a beverage preparing unit 22 known per se such as, for instance, of the type described in European patent application 0 878 158. This beverage preparing unit 22 known per se can for instance be filled with ground coffee for preparing, while supplying hot water under pressure, a café crème. This can then be collected in a mug 24 as is schematically shown in FIG. 1.

The three-way valve 7 is provided with a first member 26 which, under the influence of a liquid flow from the inlet to the first outlet and/or the second outlet, is freely moveable between a first extreme position 26A and a second extreme position 26B. The first outlet 10 is provided with a sealing ring 28, schematically represented in FIG. 1, which, when the first member 26 is in the second extreme position 26B, causes a liquid flow path extending from the inlet to the first outlet to be closed off or blocked at the first outlet.

The three-way valve is further provided with a second member 30 which, under the influence of a liquid flow from the inlet to the second outlet, is freely moveably between a third extreme position 30A and a fourth extreme position 30B. When the second member is in the third extreme position 30A, this comes to abut against a sealing ring 32, thereby closing or blocking the liquid flow path from the second outlet to the inlet.

In this example, the three-way valve is disposed in one single housing. The three-way valve is provided with a first compartment 34 in which the first member is situated and a second compartment 36 in which the second member 30 is situated. As is clearly shown in the drawing, the first compartment 34 is provided with the inlet 8 and the first outlet 10. The second compartment is provided with the second outlet 12. In this example, the first and second compartment are separated from each other by means of a dividing wall 40. The first and second compartment are connected to each other by means of a fluid communication 42 extending through the dividing wall. The dividing wall 40 is provided with an inflow opening 44 which forms an extremity of the fluid communication 42. In the form of a tube, the fluid communication 42 reaches for a part from the inflow opening 44 into the second compartment 36, which tube is closed off at its free extremity and is provided at its upper side with an outflow opening 45 which outflow opening carries the sealing ring 32 and which opening is closed off by the second member 30 when the second member is in the third extreme position which is defined by the upper side of the fluid communication 42 mentioned in the second compartment.

The first member 26 and the first compartment 34 are configured such that when the first member is in the second extreme position 26B (clearly visible in the alternative embodiment of FIG. 2b) wherein the first outlet is closed off, the liquid flow from the inlet to the second outlet extends through a part 46 of the first compartment which is located between the first member and the inlet. Also, it appears that the inflow opening 44 of the fluid communication of the first compartment is situated between the inlet 8 and the first outlet 10.

The part 46 of the first compartment further comprises the respective inflow opening 44 of the fluid communication. In this example, the first member 26 is of cylindrical design. Further, it holds in this example that the second member 30 is of convex design and that the first member is heavier than the second member. Also, it holds that the flow resistance of the first outflow 18 is smaller than the flow resistance of the second outflow 20 in combination with the beverage preparing unit 22.

The operation of the apparatus described up to this point is as follows. In rest, the first member 26 is in the first extreme position 26A. Also, the second member 30 is in the third extreme position 30A. Accordingly, there is a fluid communication from the inlet 8 to the first outlet 10 but a fluid communication from the second outlet 12 to the inlet 8 is blocked in that the second member is in the third extreme position. Also, a fluid communication is possible in the direction from the inlet to the second outlet.

For preparing a cup of coffee, the pump 6 is started. The pump 6 pumps water from the storage tank 2 to the heater 4. The heater 4 heats this water and feeds this to the inlet 8 of the three-way valve 7. The hot water flows into the first compartment and will move in the direction of the first outlet 10. Also, the water will move from the inlet 8 via the fluid communication to the second outlet 12. Then, the second member moves from the third extreme position to the fourth extreme position. As a consequence of the flow which is formed in the first compartment, the first member 26 will rapidly be moved to the second extreme position, thereby closing off the first outlet. As a consequence of the prevailing pressure in the first compartment, the first member continues to close off the first outlet well. The result is that at least virtually directly, all the water which is fed from the heater to the three-way valve leaves the three-way valve via the second outlet 12 and is fed via the second outflow path 20 to the beverage preparing unit 22. Then, the beverage suitable for consumption prepared by the beverage preparing unit is fed to the mug 24. When a sufficiently large portion of prepared product has been produced, the pump 6 is stopped. This can be done in an automatic manner with the aid of, for instance, an operating device 50. As a result, a large flow rate is no longer fed by the heater to the inlet 8 of the three-way valve. The pressure in the first compartment which retained the first member in the second extreme position during the period in which by means of the pump liquid was fed to the inlet of the three-way valve to leave the three-way valve again via the second outlet, rapidly decreases due to the relatively small flow resistance of the second member 30 functioning as a check valve. Due to this rapid decrease of the pressure, the first member will move rapidly from the second position towards the first position. The moment this happens, the first outlet 10 is no longer blocked. This means that the expansion water from the heater is directly returned via the first outflow path 18 to the storage tank. Expansion water is the water still leaving the boiler when the pump 6 has already been stopped. This is caused by the fact that the heater is still hot and sputters, as it were. Partly because of the fact that the flow resistance of the first outflow path 18 is smaller than the flow resistance of the second outflow path 20 in combination with the beverage preparing unit 22, the expansion water will choose the line of least resistance and hence flow back via the first outlet 10 and the second outflow path 18 to the storage tank. Therefore, the expansion water is prevented from being fed via the second outlet 12 to the beverage preparing unit 22. As a result, the beverage preparing unit 22 will not drip. Further, due to the cessation of the flow from the inlet to the second outlet, the second member 30 will move to the third extreme position 30A. This also happens relatively rapidly. As, as a result, the second member 30, functioning as a check valve, rapidly closes off the liquid flow path from the second outlet 12 to the inlet 8 when it takes the third extreme position, the second outflow path 20 is prevented from emptying. Hence, this remains filled with water which is advantageous when a consecutive consumption needs to be prepared. If it had been filled with air, initially, an amount of air would be fed to the beverage preparing unit 22, which is not beneficial to the quality of the prepared product. Moreover, thus, a spread in the amount of brew and therefore also a spread in dry matter (taste) will vary. Now, conversely, this is prevented.

Further, it holds that in view of the fact that the first member 26 is heavier than the second member, this firs member will fall back relatively rapidly and, consequently, leave the second extreme position relatively rapidly as described hereinabove. As the first member is cylinder-shaped, having more flow resistance than a sphere, it will moreover be rapidly lifted upon supply of a fluid to the inlet 8 (and, due to its weight, fall back rapidly upon cessation of this supply). Additionally, the flowed-through surface between the first member and the second compartment is smaller than with the second member and the second compartment, which also renders it possible for the first member to fall back more rapidly. Therefore, the first member leaving the second extreme position proceeds relatively rapidly because of the relatively heavy weight of the first member. Also, it proceeds rapidly because the convex second member constitutes a check valve with a relatively small flow resistance. Also, the short fluid communication 42 and the single housing play an advantageous part herein.

The invention is not limited in any manner to the embodiment outlined hereinabove. For instance, through the first outflow path 18, the water can also be returned to an underside of the storage tank or at the entrance of the pump 6. Both alternatives are indicated via the ducts 52 and 54, respectively.

Figure 2A:
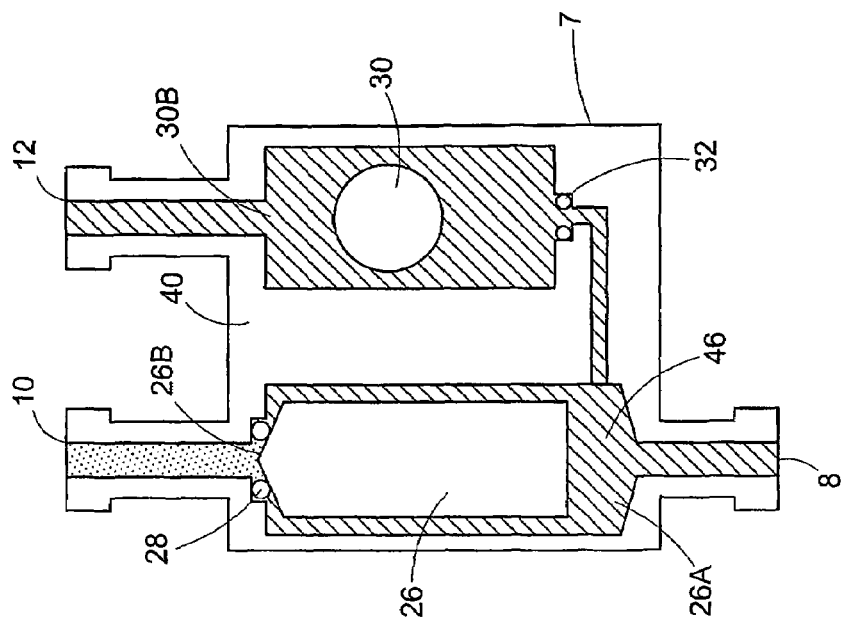
FIG. 2a shows a second embodiment of the three-way valve of FIG. 1 in a condition wherein no liquid is supplied to the inlet.
Figure 2B:
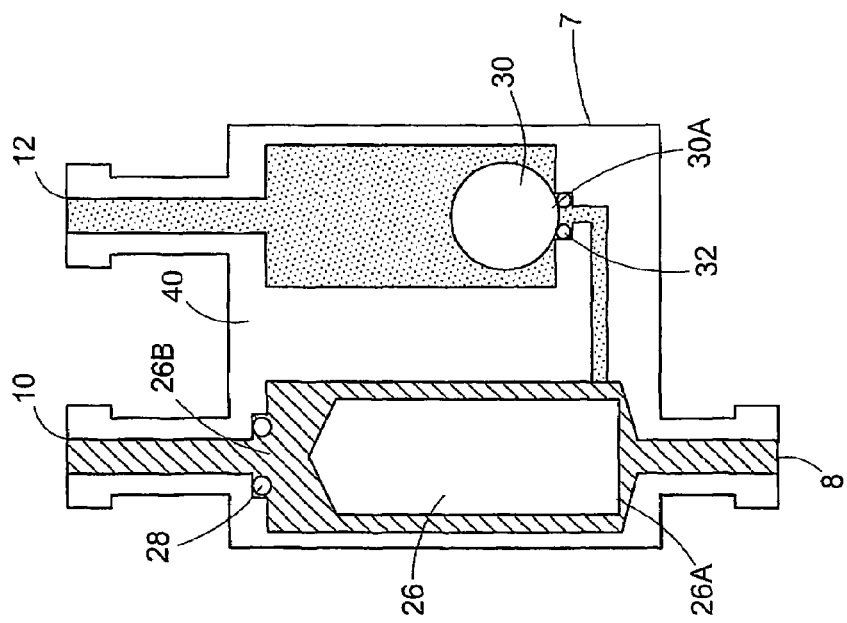
FIG. 2b shows the three-way valve of FIG. 2a in a condition wherein a liquid flow with a relatively large flow rate is supplied to the inlet.

In FIGS. 2*a* and 2*b*, a second embodiment is represented in which corresponding parts are provided with the same reference numerals. However, the operation of the three-way valve according to FIGS. 2A and 2B is entirely identical to the three-way valve of FIG. 1, so that a further explanation can be omitted.

In FIGS. 3*a* to 3*g*, a third embodiment of a three-way valve according to the invention is shown, suitable to be used in the apparatus according to FIG. 1. Here, parts corresponding with FIG. 1 and FIG. 2 are provided with the same reference numerals as in FIG. 1 and FIG. 2. The three-way valve 7 according to FIGS. 3*a* to 3*g* is also provided with the inlet 8, the first outlet 10 and the second outlet 12. The inlet 8 is connected by means of a fluid communication 8 to the first compartment 34. Further, the inlet 8 is connected by means of a fluid communication 48, 51 to the second compartment 36.

In this example, the first member 26 is designed as a freely moveable circumferential edge 26 of a first umbrella valve 52. Further, the three-way valve is provided with a first seat 54 for the first umbrella valve 52. The first umbrella valve 52 is connected to the first seat 54 by means of a stem 56 of the first umbrella valve. Between the first seat 54 and a housing 58 of the three-way valve, a sealing ring 59 is disposed.

Figure 3A:
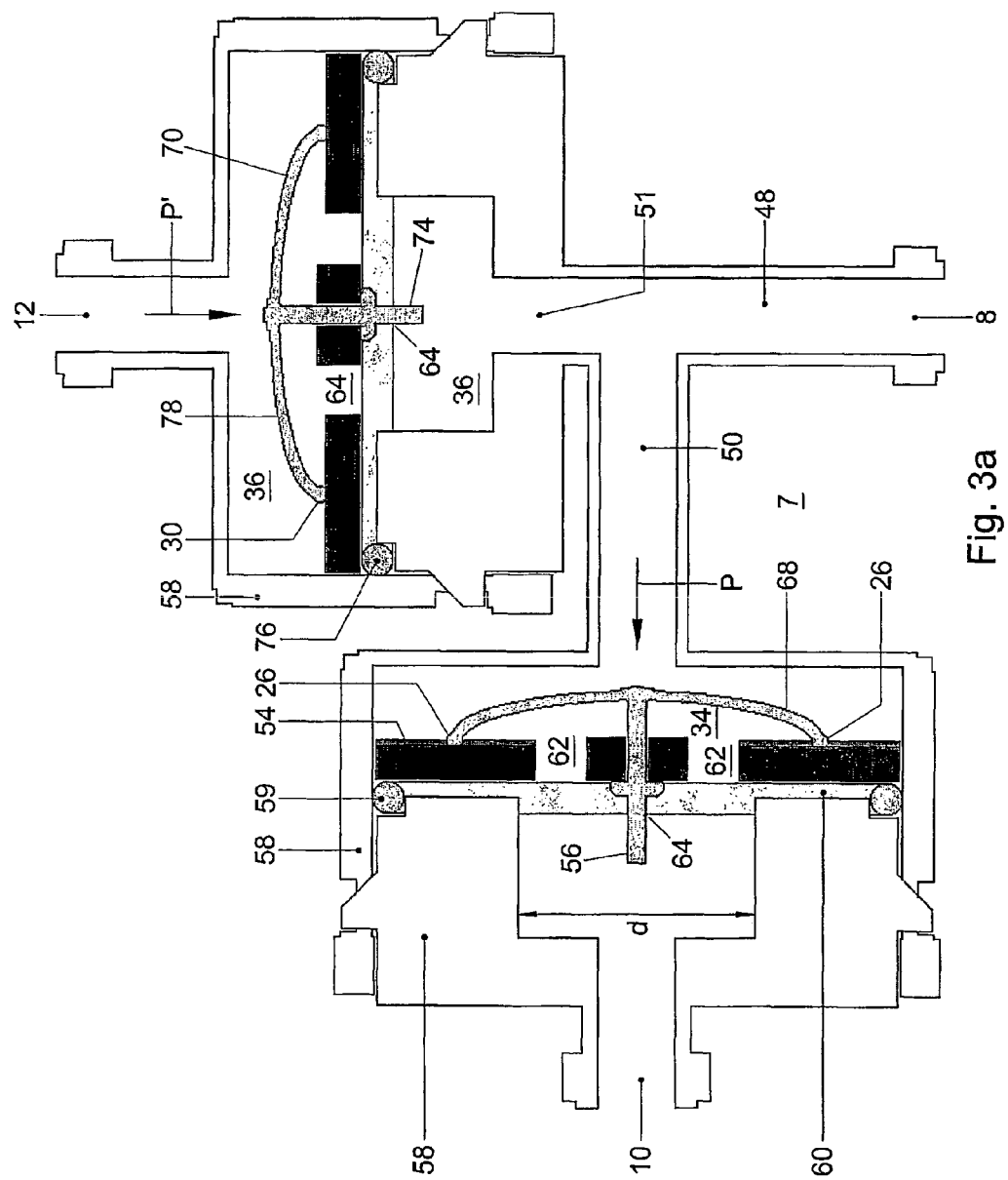
FIG. 3a shows a cross section of a third embodiment of a three-way valve according to the invention.
Figure 3C:
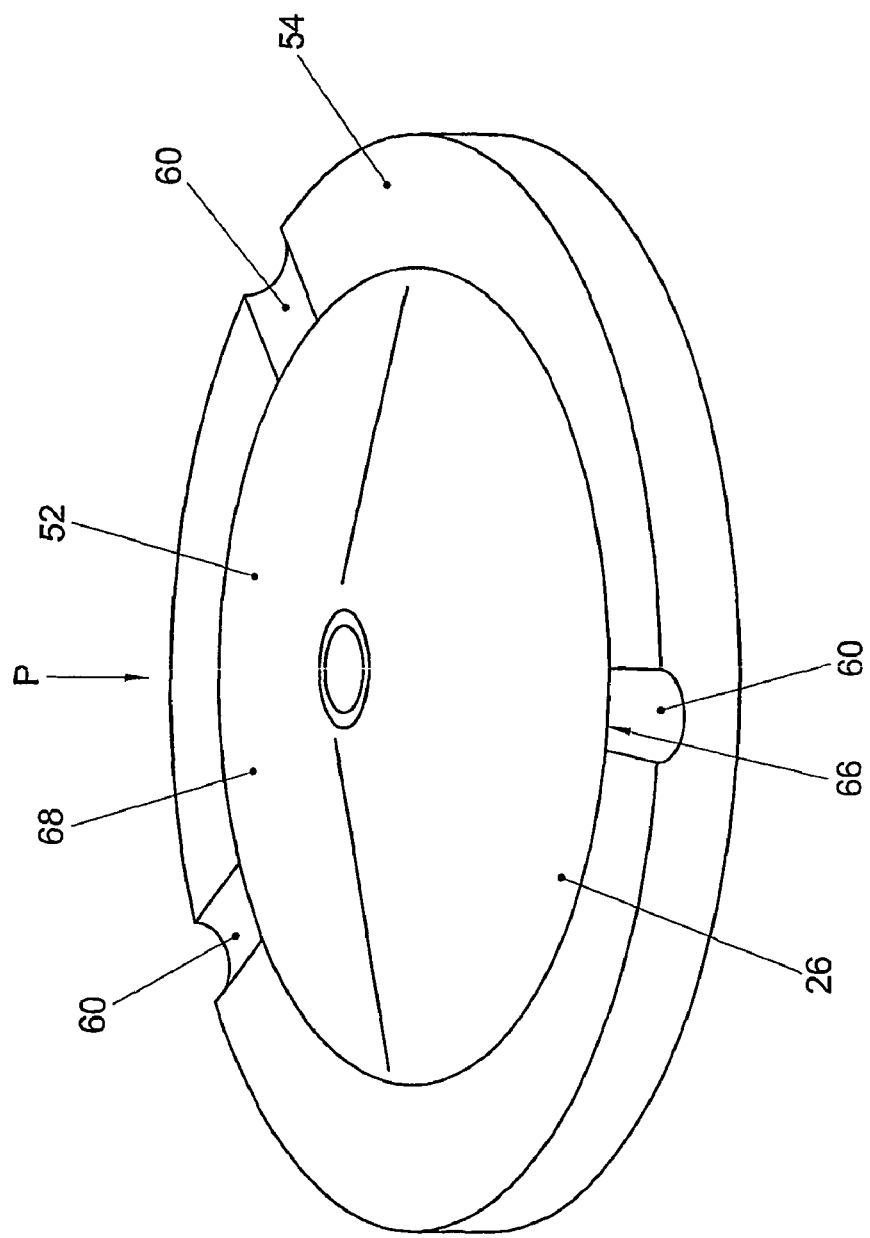
Figure 3D:
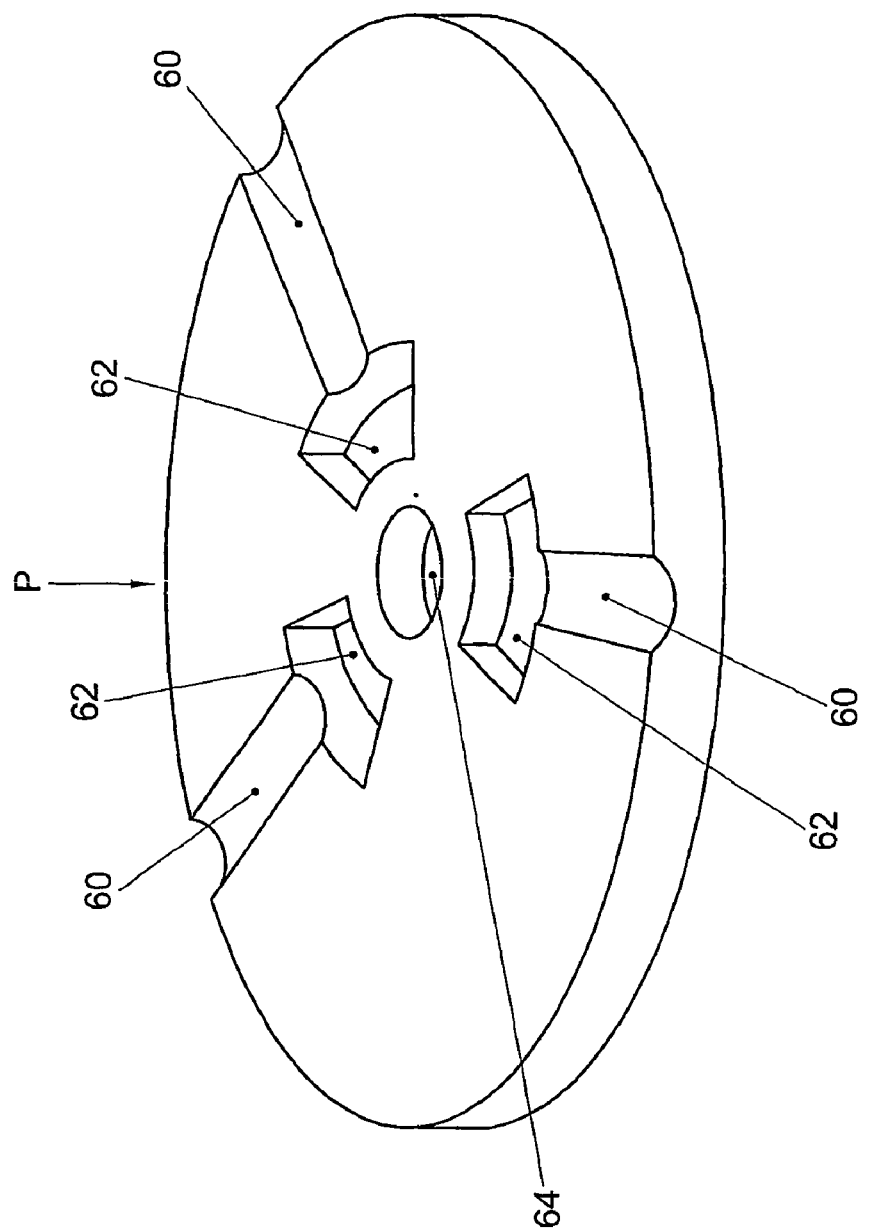
FIG. 3d shows a front view of the first valve seat according to FIG. 3c without the first umbrella valve.

FIG. 3*c* shows a front view of the first seat 54 with the first umbrella valve 52 in the direction of the arrow p of FIG. 3*a*. Here, it is shown that the first seat is provided with at least one and in this example a number of grooves 60 (see also FIG. 3*d*). Also, in FIG. 3*d*, it appears that in the first seat at least one, and in this example a number of flow-through openings 62 are provided as well as a mounting opening 64 through which the stem 56 of the first umbrella valve 52 extends. In FIG. 3*c*, the first umbrella valve itself is also shown.

Figure 3E:
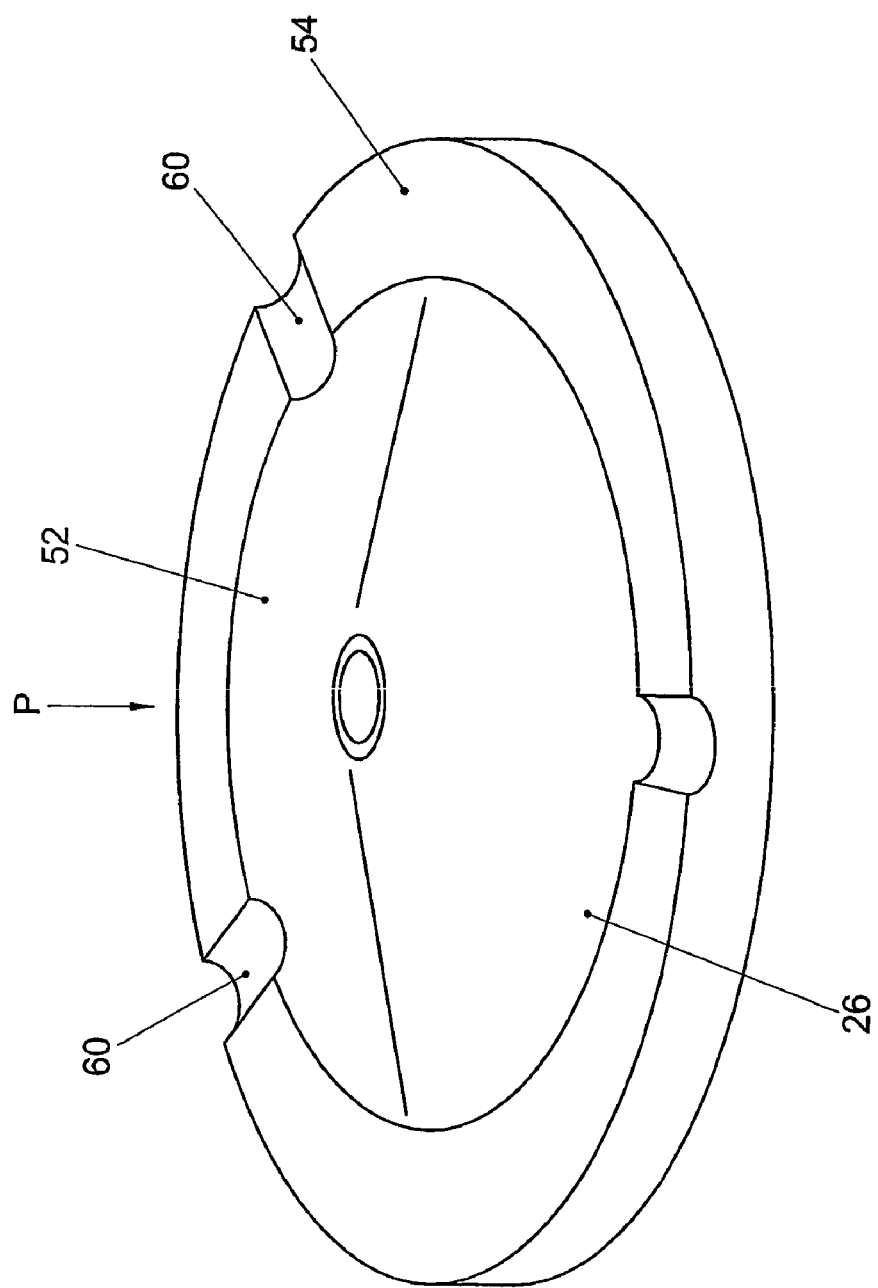
FIG. 3e shows a front view as in FIG. 3c when the first umbrella valve is in the second extreme position.

In the first extreme position of the first member 26, the freely moveable circumferential edge 26 (the first member) abuts against the first seat as shown in FIGS. 3*a*, 3*b* and 3*c*. However, the circumferential edge 26 reaches over the grooves 60 so that between the circumferential edge 26 and the grooves 60 a flow-through opening 66 is formed (see FIG. 3*c*). This flow-through opening 66 provides for a fluid communication between the inlet 8 and the first outlet 10. This means that when the first member 26 is in the first extreme position, the first outlet is not closed off and that the liquid can flow from the inlet 8 to the first outlet 10. However, it holds that under the influence of a flow from the inlet 8 to the first outlet 10 and/or the second outlet 12, the free circumferential edge 26 will move to a second extreme position. In the second extreme position, the circumferential edge 26 extends in the groove 60 so that the flow-through opening 66 is closed off. More in particular, it holds that in the second extreme position, the circumferential edge 26 of the first umbrella valve abuts against the seat and the bottom of the groove (see FIG. 3*e*). Thus, at an increasing fluid flow through the inlet 8, the first member (the circumferential edge 26) will move from the first extreme position to the second extreme position. All this is shown in FIG. 3*e*.

Hence, the first umbrella valve is located in a liquid flow path extending between the inlet and the first outlet. Further, it holds that the first umbrella valve has a convex outer surface 68 facing away from the first outlet 10. Hence, the convex outer surface is directed against the flow direction from the inlet to the first outlet.

Figure 3F:
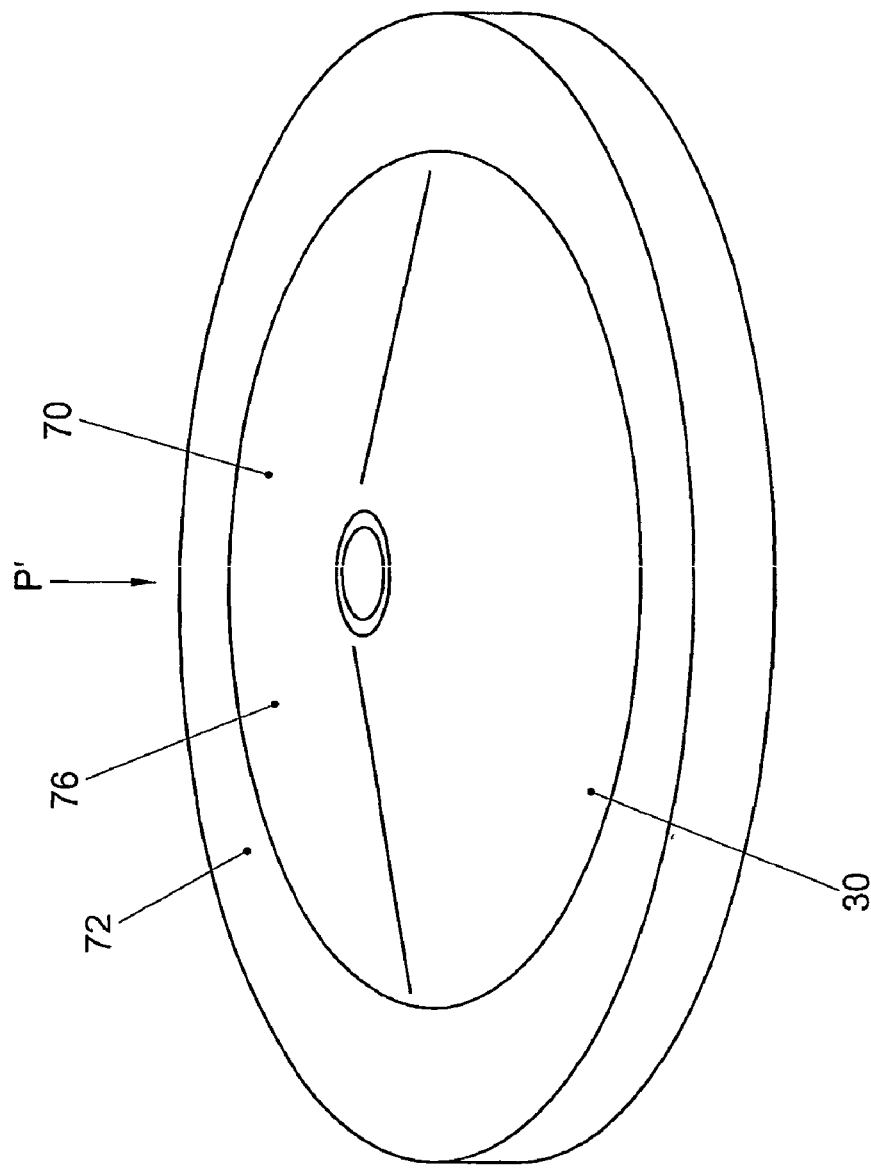
Figure 3G:
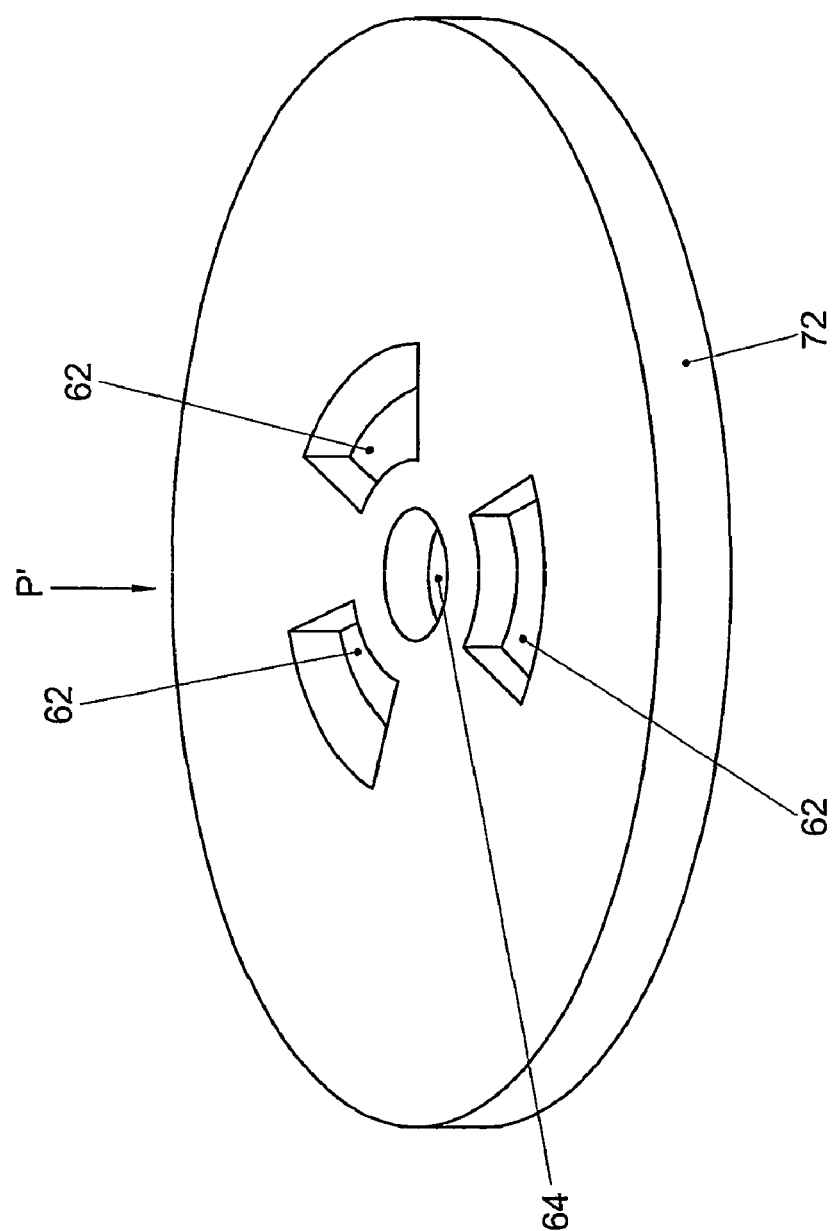
FIG. 3g shows a front view of a second valve seat of the second outlet of the three-way valve of FIG. 3d.

In this example, it further holds that the second member 30 is designed as a freely moveable circumferential edge 30 of a second umbrella valve 70. The three-way valve is further provided with a second seat 72 for the second umbrella valve 70. The second umbrella valve 70 is connected to the second seat 72 by means of a stem 74 of the second umbrella valve 70. Between the second seat 72 and the housing 58 of the three-way valve a sealing 76 is located. The second seat 72 corresponds to the first seat 54, the difference being that the second seat 72 is not provided with grooves 60. A front view in the direction of the arrow p' of the second umbrella valve 70 with the second seat 72 is shown in FIG. 3*f*. A front view according to FIG. 3*f* wherein the second umbrella valve 70 has been left out is shown in FIG. 3*g*. The second seat 72 too is therefore provided with flow-through opening 62 and a mounting opening 64 through which the stem 74 extends.

Further, it holds that the second umbrella valve has a convex outer surface facing the second outlet. Hence, the convex outer surface 78 of the second umbrella valve is directed in the flow direction from the inlet to the second outlet.

In FIG. 3*f* as well as in FIG. 3*a*, the second member (the circumferential edge 30 of the second umbrella valve 70) is shown in the third extreme position. In the third extreme position the circumferential edge 30 of the second umbrella valve abuts against the second seat 72. This blocks a liquid flow from the second outlet in the direction of the inlet 8. However, in the fourth extreme position an intermediate space is present between the circumferential edge 30 and the second seat 72.

When an increasing liquid flow is supplied to the inlet 8, the circumferential edge 26, as already discussed, will start moving from the first extreme position towards the second extreme position. As a result, eventually, the first outlet 8 will be closed off. Also, under the influence of the fluid flow, due to the three-way valve the second circumferential edge 30 will move towards the fourth extreme position. In the fourth extreme position the second circumferential edge 30 lies completely clear of the seat 72. This is what is meant by the fourth extreme position. Hence, in that case, the circumferential edge 30 moves in the direction of the arrow v as shown in FIG. 3*b*. Consequently, the fluid can flow from the inlet 8 to the second outlet 12. When, conversely, the second member 30 is in the third extreme position, a fluid flow from the second outlet in the direction of the inlet is blocked. Accordingly, the operation of the three-way valve according to FIGS. 3*a* to 3*g* is completely analogous to the operation of the three-way valve as described with reference to FIGS. 1 and 2.

In rest, the first member 26 is in the first extreme position while the flow-through openings 66 are cleared. Also, the second member is in the third extreme position wherein a liquid flow from the second outlet 12 towards the inlet 8 is blocked. Accordingly, there is a fluid communication present from the inlet to the first outlet and that a fluid communication from the second outlet 12 to the inlet 8 is blocked by the second member located in the third extreme position. A fluid communication from the inlet to the second outlet is also possible. When the pump 6 is started, the hot water flows into the first compartment and will move in the direction of the first outlet 10. The water will also move from the inlet 8 to the second outlet 12. As a consequence of the flow which arises, the first circumferential edge 26 will be moved to the second extreme position and hence close off the first outlet. The second circumferential edge 30 then moves from the third extreme position to the fourth extreme position so that the fluid can flow from the inlet to the second outlet. The beverage suitable for consumption then prepared by the beverage preparing unit is fed to the mug 24. When, hereupon, the pump 6 is stopped, no longer a large flow rate is fed by the heater to the inlet 8 of the three-way valve. As a result, the pressure in the first compartment 34 decreases. As the pressure decreases, the first circumferential edge 26 is no longer kept in the second position. The first circumferential edge 26 then moves from the second position to the first position. The moment this happens, the first inlet 10 is no longer blocked. This means that the expansion water from the heater can be directly returned via the first outflow path 18 to the storage tank. Further, due to the cessation of the flow from the inlet to the second outlet, the second circumferential edge will start moving to the third extreme position. This also happens relatively rapidly. As a result, a liquid flow from the second outlet 12 in the direction of the inlet 8 is blocked.

The invention is not limited in any way to the exemplary embodiments outlined hereinabove. For instance, instead of coffee, with the aid of the hot water also other beverages such as cocoa and tea can be prepared. Also, the heater 4 can be omitted so that also cold beverages such as ice tea can be prepared. Further, the three-way valve can also be used for other uses. Also, the fluid flowing through the three-way valve need not be liquid but can also be a gas such as steam. Such variants are all understood to fall within the framework of the invention.

The invention claimed is:

1. An apparatus for preparing at least one type of beverage suitable for consumption such as coffee or cocoa on the basis of a hot liquid such as water, provided with a storage tank which, in use, is filled with a liquid such as water, a heater and a three-way valve, wherein the three-way valve is provided with an inlet, a first outlet and a second outlet, a pump being in fluid communication with the storage tank and an inlet of the heater for pumping the liquid from the storage tank to the heater and wherein an outlet of the heater is in fluid communication with the inlet of the three-way valve, the first outlet of the three-way valve being in fluid communication via a first outflow path with the storage tank and/or an inlet of the pump for returning liquid from the three-way valve to the storage tank and/or the pump and wherein the second outlet of the three-way valve is in fluid communication via a second outflow path with a beverage preparing unit for preparing, on the basis of the hot liquid, the beverage suitable for consumption, the three-way valve being provided with a first member which is freely moveable, under the influence of a liquid flow from the inlet to the first outlet and/or the second outlet, between a first and second extreme position, wherein the first member can move, under the influence of the liquid flow from the inlet to the first outlet and/or the second outlet from the first extreme position towards the second extreme position and in the second extreme position closes off the first outlet, so that the liquid flow then extends from the inlet to the second outlet, characterized in that the three-way valve is further provided with a second member which is freely moveable, under the influence of a liquid flow from the inlet to the second outlet, between a third and a fourth extreme position, wherein the second member can move, under the influence of the liquid flow from the inlet to the second outlet, from the third extreme position towards the fourth extreme position, and in the third extreme position blocks a liquid flow from the second outlet in the direction of the inlet.

2. An apparatus according to claim 1, characterized in that the three-way valve is disposed in one single housing.

3. An apparatus according to claim 1, characterized in that the three-way valve is provided with a first compartment in which the first member is situated, a second compartment in which the second member is situated and a fluid communication between the first and second compartment.

4. An apparatus according to claim 3, characterized in that the first compartment is provided with the inlet and the first outlet.

5. An apparatus according to claim 3, wherein the second compartment is provided with the second outlet.

6. An apparatus according to claim 4, wherein an inflow opening of the fluid communication in the first compartment is located between the inlet and the first outlet.

7. An apparatus according to claim 6, wherein the first member and the first compartment are configured such that when the first member is in the second extreme position with the first outlet closed off, a liquid flow from the inlet to the second outlet extends through a part of the first compartment situated between the first member and the inlet.

8. An apparatus according to claim 3, wherein the first and second compartment are separated from each other by means of a dividing wall while the fluid communication extends through the dividing wall.

9. An apparatus according to claim 7, wherein said part of the first compartment comprises the inflow opening of the fluid communication.

10. An apparatus according to claim 1, wherein the three-way valve allows a liquid flow from the inlet to the first outlet when the first member is not in the second extreme position.

11. An apparatus according to claim 1, wherein the three-way valve allows a liquid flow from the inlet to the second outlet when the second member is not in the third extreme position.

12. An apparatus according to claim 1, wherein the first member is of cylindrical design.

13. An apparatus according to claim 1, wherein the second member is of convex design.

14. An apparatus according to claim 1, wherein the first member is heavier than the second member.

15. An apparatus according to claim 1, wherein a flow resistance of the first outflow is smaller than a flow resistance of the second outflow in combination with the beverage preparing unit.

16. An apparatus according to claim 1, wherein the first member is designed as a freely moveable circumferential edge of a first flexible umbrella valve and the three-way valve is provided with a first seat for the first umbrella valve wherein the first umbrella valve is connected to the first seat and the first seat is provided with at least one groove wherein in the first extreme position the circumferential edge of the first umbrella valve abuts against the first seat and extends over the groove so that a space is present between the circumferential edge of the first umbrella valve and the groove, which space releases a liquid flow from the inlet to the first outlet and wherein in the second extreme position the circumferential edge of the first umbrella valve abuts against the seat and extends into the groove so that the circumferential edge closes off the first outlet.

17. An apparatus according to claim 16, characterized in that in the second extreme position the circumferential edge of the first umbrella valve abuts against the seat and the bottom of the groove.

18. An apparatus according to claim 16, characterized in that the first umbrella valve is situated in a liquid flow path extending between the inlet and the first outlet.

19. An apparatus according to claim 18, characterized in that the first umbrella valve has a convex outer surface facing away from the first outlet.

20. An apparatus according to any claim 16, wherein the second member is designed as a freely moveable circumferential edge of a second flexible umbrella valve and the three-way valve is provided with a second seat for the second umbrella valve wherein the second umbrella valve is connected to the second seat, while in the third extreme position the circumferential edge of the second umbrella valve abuts against the second seat and blocks a liquid flow from the second outlet in the direction of the inlet and wherein in the fourth extreme position an intermediate space is present between the circumferential edge of the second umbrella valve and the second seat.

21. An apparatus according to claim 20, characterized in that the second umbrella valve is situated in a liquid flow path extending between the inlet and the second outlet.

22. An apparatus according to claim 21, characterized in that the second umbrella valve has a convex outer surface facing towards the second outlet.

23. An apparatus according to claim 1, wherein from the inlet to the first member and from the inlet to the second member non-closable fluid flow paths are present.

24. A three-way valve provided with an inlet, a first outlet and a second outlet wherein the three-way valve is provided with a first member which is freely moveable, under the influence of a liquid flow from the inlet to the first outlet and/or the second outlet, between a first and second extreme position wherein the first member can move, under the influence of the liquid flow from the inlet to the first outlet and/or the second outlet, from the first extreme position towards the second extreme position and in the second extreme position closes off the first outlet so that the liquid flow then extends from the inlet to the second outlet, characterized in that the three-way valve is further provided with a second member which is freely moveable, under the influence of a liquid flow from the inlet to the second outlet, between a third and fourth extreme position wherein the second member can move, under the influence of the liquid flow from the inlet to the second outlet, from the third extreme position in the direction of the fourth extreme position and in the third extreme position blocks a liquid flow from the second outlet in the direction of the inlet, wherein the first member is designed as a freely moveable circumferential edge of a first flexible umbrella valve and the first outlet is provided with a first seat for the first umbrella valve, the first umbrella valve being connected with the first outlet and the first seat being provided with a groove while in the first extreme position the circumferential edge of the first umbrella valve abuts against the first seat and extends over the groove so that a space is present between the circumferential edge of the first umbrella valve and the groove, which space releases a liquid flow from the inlet to the first outlet and wherein in the second extreme position the circumferential edge of the first umbrella valve abuts against the seat and extends in the groove so that the circumferential edge closes off the first outlet.

25. A three-way valve according to claim 24, characterized in that in the second extreme position the circumferential edge of the first umbrella valve abuts against the seat and the bottom of the groove.

26. A three-way valve according to claim 24, characterized in that the first umbrella valve is in a liquid flow path extending between the inlet and the first outlet.

27. A three-way valve according to claim 26, characterized in that the first umbrella valve has a convex outer surface facing away from the first outlet.

28. A three-way valve according to claim 24, wherein the second member is designed as a freely moveable circumferential edge of a second flexible umbrella valve and the second outlet is provided with a second seat for the second umbrella valve while the second umbrella valve is connected to the second seat wherein in the third extreme position the circumferential edge of the second umbrella valve abuts against the second seat and blocks a liquid flow from the second outlet in the direction of the inlet and wherein in the fourth extreme position an intermediate space is present between the circumferential edge of the second umbrella valve and the second seat.

29. A three-way valve according to claim 28, characterized in that the second umbrella valve is located in a liquid flow path extending between the inlet and the second outlet.

30. A three-way valve according to claim 29, characterized in that the second umbrella valve has a convex outer surface facing towards the second outlet.

31. A three-way valve according to claim 24, wherein from the inlet to the first member and from the inlet to the second member non-) closable fluid flow paths are present.

* * * * *